(12) United States Patent
Allred et al.

(10) Patent No.: US 9,213,577 B2
(45) Date of Patent: Dec. 15, 2015

(54) SUSTAINABLE DIFFERENTIALLY RELIABLE ARCHITECTURE FOR DARK SILICON

(71) Applicants: Jason M. Allred, Ogden, UT (US); Koushik Chakraborty, Logan, UT (US); Sanghamitra Roy, Logan, UT (US)

(72) Inventors: Jason M. Allred, Ogden, UT (US); Koushik Chakraborty, Logan, UT (US); Sanghamitra Roy, Logan, UT (US)

(73) Assignee: Utah State University, North Logan, UT (US)

( * ) Notice: Subject to any disclaimer, the term of this patent is extended or adjusted under 35 U.S.C. 154(b) by 144 days.

(21) Appl. No.: 14/046,335

(22) Filed: Oct. 4, 2013

(65) Prior Publication Data

US 2015/0100930 A1    Apr. 9, 2015

(51) Int. Cl.
*G06F 17/50*     (2006.01)
*G06F 9/50*      (2006.01)

(52) U.S. Cl.
CPC .................................. *G06F 9/5044* (2013.01)

(58) Field of Classification Search
CPC . H01L 22/20; G01R 31/2846; G06F 17/5022; G06F 2217/70
USPC .................................................. 716/132–136
See application file for complete search history.

(56) References Cited

U.S. PATENT DOCUMENTS 8,615,724 B2 * 12/2013 Durkan ........................... 716/56
2009/0307636 A1 * 12/2009 Cases et al. ...................... 716/2

OTHER PUBLICATIONS

Pop et al., Scheduling and Voltage Scaling for Energy/Reliability Trade-offs in Fault-Tolerant Time-Triggered Embedded Systems, ACM, Oct. 3, 2007, pp. 233-238.*
Ancajas, D. M., et al., Proactive aging management in heterogeneous NoCs through a criticality-driven routing approach, Design, Automation & Test in Europe Conference & Exhibition, Mar. 18-22, 2013, p. 1032-1037.
Assayad, I., et al., Tradeoff exploration between reliability, power consumption, and execution time, Computer Safety, Reliability, and Security, 2011, p. 437-451.
Bhardwaj, S., et al., Predictive Modeling of the NBTI Effect for Reliable Design, Custom Integrated Circuits Conference, Sep. 10-13, 2006, p. 189-192.
Calimera, A., et al., NBTI-Aware Power Gating for Concurrent Leakage and Aging Optimization, Proceedings of the 14th ACM/IEEE international symposium on low power electronics and design, 2009, p. 127-132.
Chippa, V.K., et al., Analysis and Characterization of Inherent Application Resilience for Approximate Computing, Design Automation Conference, May 29-Jun. 29, 2013, p. 1-9.
Chong, I. S., et al., Hardware Testing for Error Tolerant Multimedia Compression based on Linear Transforms, Defects and Fault Tolerance in VLSI Systems, Oct. 3-5, 2005, p. 523-531.

(Continued)

*Primary Examiner* — Nghia Doan

(57) ABSTRACT

For mapping a sustainable, differentially reliable architecture for dark silicon, a calculation module calculates an expected energy efficiency for a prior mapping of process threads for a plurality of cores. The calculation module further calculates a workload acceptance capacity (WAC) from degradation rates for the plurality of cores. A map module maps the process threads to the plurality of cores based on at least one of the expected energy efficiency and the WAC to satisfy a mapping policy. A specified number of the plurality of cores is not powered.

20 Claims, 8 Drawing Sheets

(56) References Cited

OTHER PUBLICATIONS

Choudhary, V. K., et al., FabScalar: Composing Synthesizable RTL Designs of Arbitrary Cores within a Canonical Superscalar Template, Proceedings of the 38th Annual International Symposium on Computer Architecture, 2011, p. 11-22.

Chung, H., et al., Analysis and Testing for Error Tolerant Motion Estimation, Defect and Fault Tolerance in VLSI Systems, Oct. 3-5, 2005, p. 514-522.

Das, S., et al., RazorII: In Situ Error Detection and Correction for PVT and SER Tolerance, Solid-State Circuits, Jan. 2009, p. 32-48, vol. 44, iss. 1.

Dimitrov, M., et al., Understanding Software Approaches for GPGPU Reliability, GPGPU-2 Proceedings of 2nd Workshop on General Purpose Processing on Graphics Processing Units, 2009, p. 94-104.

Esmaeilzadeh, H., et al., Dark Silicon and the End of Multicore Scaling, ISCA '11 Proceedings of the 38th Annual International Symposium on Computer Architecture, 2011, p. 365-376.

Goulding-Hotta, N., et al., GreenDroid: An Architecture for the Dark Silicon Age, Design Automation Conference, Jan. 30-Feb. 2, 2012, p. 100-105.

Hardavellas, N., et al., Toward Dark Silicon in Servers, IEEE Micro, Jul./Aug. 2011, p. 6-15, vol. 31, iss. 4.

Kahng, A., et al., Designing a Processor From the Ground Up to Allow Voltage/Reliability Tradeoffs, High Performance Computer Architecture, Jan. 9-14, 2010, p. 1-11.

Leem, L., et al., ERSA: Error-Resilient System Architecture for Probabilistic Applications, Design, Automation & Test in Europe Conference & Exhibition, Mar. 8-12, 2010, p. 1560-1591.

Li, X., et al., Application-Level Correctness and its Impact on Fault Tolerance, High Performance Computer Architecture, Feb. 10-14, 2007, p. 181-192.

Lu, Y., et al., Statistical Reliability Analysis Under Process Variation and Aging Effects, Design Automation Conference, Jul. 26-31, 2009, p. 514-519.

Magnusson, P. S., et al., Simics: A Full System Simulation Platform, Computer, Feb. 2002, p. 50-58, vol. 35, iss. 2.

Nowroth, D., et al., A Study of Cognitive Resilience in a JPEG Compressor, Dependable Systems and Networks with FTCS and DCC, Jun. 24-27, 2008, p. 32-41.

Pop, P., et al., Scheduling and Voltage Scaling for Energy/Reliability Trade-offs in Fault-Tolerant Time-Triggered Embedded Systems, Hardware/Software Codesign and System Synthesis, Sep. 30-Oct. 3, 2007, p. 233-238.

Sherwood, T., et al., Basic Block Distribution Analysis to Find Periodic Behavior and Simulation Points in Applications, Parallel Architectures and Compilation Techniques, 2001, p. 3-14.

Shim, B., et al., Energy-Efficient Soft Error-Tolerant Digital Signal Processing, Very Large Scale Integration (VLSI) Systems, Apr. 2006, p. 336-348, vol. 14, iss. 4.

Song, W., et al., Reliability Implications of Power / Thermal Constrained Operations in Asymmetric Multicore Processors, Proceedings of Dark Silicon (DaSi), 2012.

Srinivasan, J., et al., Exploiting Structural Duplication for Lifetime Reliability Enhancement, Computer Architecture, Jun. 4-8, 2005, p. 520-531.

Taylor, M. B., Is Dark Silicon Useful? Harnessing the Four Horsemen of the Coming Dark Silicon Apocalypse, Design Automation Conference, Jun. 3-7, 2012, p. 1131-1136.

Williams, D., et al., A Cross-Layer Approach to Heterogeneity and Reliability, Formal Methods and Models for Co-Design, Jul. 13-15, 2009, p. 88-97.

Zhang, Y., et al., Lighting the Dark Silicon by Exploiting Heterogeneity on Future Processors, Design Automation Conference, May 29-Jun. 7, 2013, p. 1-7.

\* cited by examiner

201

| Core ID 350 |
|---|
| Design Time Reliability Level 205 |
| Current Reliability Level 265 |
| Reliability Error Vector 355 |
| Error Desired Level 225 |
| Desired Reliability Level 215 |
| WAC 235 |
| Scheduled Process Threads 270 |
| Reliability Demands 275 |
| Process Thread Mapping 245 |
| Delay and Error Rates 255 |
| Expected Energy Efficiency 280 |
| Utilization 285 |
| Degradation Rates 290 |

SUSTAINABLE DIFFERENTIALLY RELIABLE ARCHITECTURE FOR DARK SILICON

BACKGROUND

1. Field

The subject matter disclosed herein relates to a reliable architecture and more particularly relates to mapping a sustainable, differentially reliable architecture for dark silicon.

2. Description of the Related Art

A semiconductor device may include dark silicon, portions of the device that are not powered to reduce energy consumption. In addition, the portions of the device may have varying reliability targets.

BRIEF SUMMARY

A method for mapping a sustainable, differentially reliable architecture for dark silicon is disclosed. A calculation module calculates an expected energy efficiency for a prior mapping of process threads for a plurality of cores. The calculation module further calculates a workload acceptance capacity (WAC) from degradation rates for the plurality of cores. A map module maps the process threads to the plurality of cores based on at least one of the expected energy efficiency and the WAC to satisfy a mapping policy. A specified number of the plurality of cores is not powered. An apparatus and computer program product also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
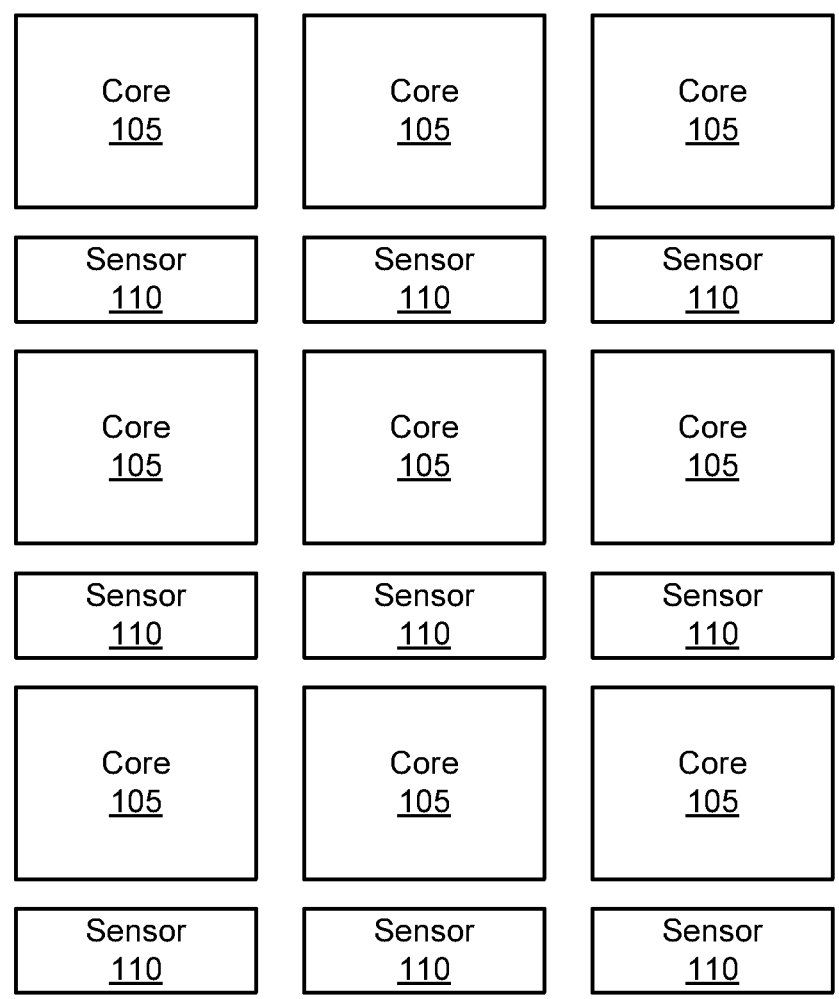
FIG. 1 is a schematic block diagram illustrating one embodiment of a multi-core semiconductor.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing computer readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in computer readable code and/or software for execution by various types of processors. An identified module of computer readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a computer readable signal medium or a computer readable storage medium. The computer readable storage medium may be a storage device storing the computer readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable code embodied therein, for example, in baseband or as part of a carrier wave. Such a propagated signal may take any of a variety of forms, including, but not limited to, electro-magnetic, optical, or any suitable combination thereof. A computer readable signal medium may be any storage device that is not a computer readable storage medium and that can communicate, propagate, or transport a program for use by or in connection with an instruction execution system, apparatus, or device. Computer readable code embodied on a storage device may be transmitted using any appropriate medium, including but not limited to wireless, wire line, optical fiber cable, Radio Frequency (RF), etc., or any suitable combination of the foregoing.

Computer readable code for carrying out operations for embodiments may be written in any combination of one or more programming languages, including an object oriented programming language such as Java, Smalltalk, C++ or the like and conventional procedural programming languages, such as the "C" programming language or similar programming languages. The computer readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by computer readable code. These computer readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable code may also be stored in a storage device that can direct a core of a multi-core semiconductor to function in a particular manner, such that the instructions stored in the storage device produce an article of manufacture including instructions which implement the function/act specified in the schematic flowchart diagrams and/or schematic block diagrams block or blocks.

The computer readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable code.

Descriptions of Figures may refer to elements described in previous Figures, like numbers referring to like elements.

FIG. 1 is a schematic block diagram illustrating one embodiment of a semiconductor 100. The semiconductor 100 is a multi-core device comprising a plurality of cores 105. Some of the cores 105 may not be powered. The unpowered cores 105 may also be referred to as dark silicon. Cores 105 may not be powered to reduce power consumption and/or distribute circuit degradation.

One or more sensors 110 may monitor the cores 105. In one embodiment, the sensors 110 detect a delay in an electrical signal within a core 105 and/or between cores 105. In one embodiment, an electrical signal is delayed if the electrical signal transitions after a delay threshold. The delay threshold may be a specified time interval after the initiation of a clock cycle for the core 105.

Alternatively, the sensors 110 may detect an error in an electrical signal within a core 105 and/or between cores 105. An error for the electrical signal may be detected if the electrical signal transitions after an error threshold. The error threshold may be a specified time interval after the initiation of the clock cycle for the core 105.

Each core 105 may be assigned one or more process threads. The process threads may communicate, resulting in communications between process threads in a core 105 and communications between process threads in different cores 105. The relative mapping of the process threads among the cores 105 may significantly affect both the energy efficiency and the reliability of the semiconductor 100. For example, an increased energy usage may increase the degradation and/or aging of circuits within the semiconductor 100. And of course, increased energy use decreases the energy efficiency of the semiconductor 100.

The performance of the semiconductor 100 may be improved by considering energy efficiency and/or sustainability when mapping process threads to the cores 105. As used herein, sustainability refers to reducing circuit degradation and/or aging. In addition, sustainability may refer to balance degradation and/or again so that no circuit fails significantly sooner than other circuits.

Unfortunately, in the past, the mapping of process threads while considering energy efficiency and sustainability has been computationally impractical. The difficulties of mapping the process threads are further increased when some of the cores 105 must not be powered in order to satisfy an energy budget. The embodiments described herein map process threads to the cores 105 in order to achieve sustainability and differential reliability for the semiconductor 100.

Figure 2:
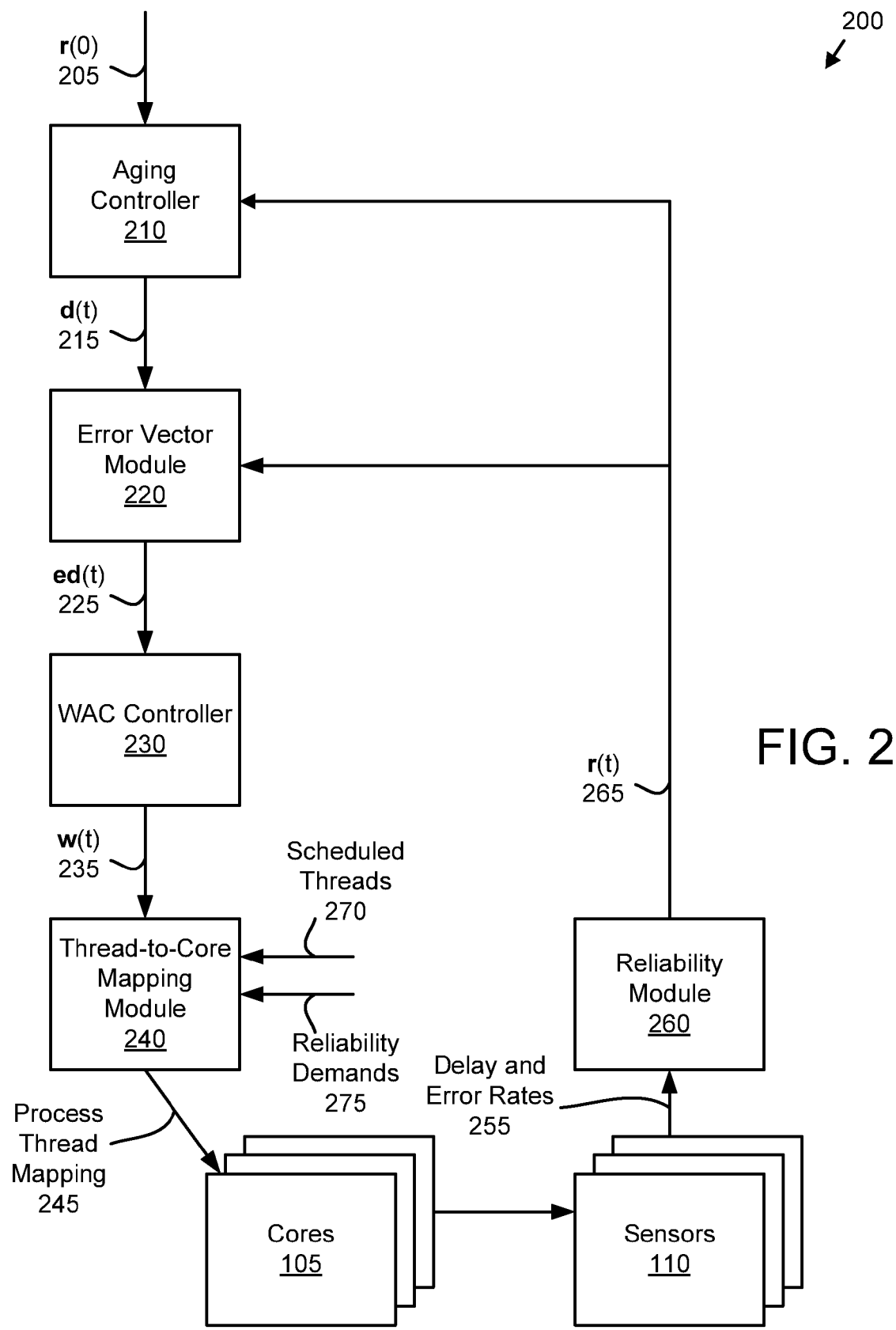
FIG. 2 is a schematic block diagram illustrating one embodiment of a mapping process.

FIG. 2 is a schematic block diagram illustrating one embodiment of a mapping process 200. The process 200 may be performed by one or more cores 105 in the semiconductor 100. The process 200 employees in aging controller 210, an error vector module 220, a workload acceptance capacity (WAC) controller 230, a thread-to-core mapping module 240, the cores 105, the sensors 110, and a reliability module 260. The error vector module 220, WAC controller 230, thread-to-core mapping module 240, and reliability module 260 may be embodied in elements of a mapping apparatus.

The aging controller 210 receives a vector of design time reliability levels r(0) 205. The design time reliability levels 205 may be predetermined for the semiconductor 100. For example, a designer, design software, or the like may specify the design time reliability levels 205 for the semiconductor 100, individual cores 105, or combinations thereof.

The aging controller 210 further receives a vector of current reliability levels r(t) 265 from the reliability module 260, where t identifies a process thread. The generation of the current reliability levels 265 will be described hereafter. The aging controller 210 may generate a error desired vector ed(t) 225 from the design time reliability levels 205 and the current reliability levels 265.

In one embodiment, the aging controller 210 calculates a reliability error vector er(t) using Equation 1, where t is a process thread.

$$er(t)=r(0)-r(t) \qquad \text{Figure 1}$$

The aging controller 210 may further calculate a desired reliability level vector d(t) 215. The desired reliability level vector d(t) may be calculated using Equation 2, for each ith process thread.

$$d(t) = r(0) - \sum_{i=1}^{n} er_i(t)x\frac{1-r(0)}{n-\sum_{i=1}^{n}r_i(0)} \qquad \text{Equation 2}$$

In one embodiment, the error vector module 220 calculates the error desired vector ed(t) 225 using Equation 3.

$$ed(t)=d(t)-r(t) \qquad \text{Equation 3}$$

The WAC controller 230 may receive the error desired vector ed(t) 225 and generate a workload acceptance capacity (WAC). The WAC may be WAC vector w(t) 235, with a WAC value for each core 105. WAC vector w(t) 235 may be calculated using Equation 4, where $K_p$ is a proportional gain constant, $\gamma$ is a percentage of the cores 105 that are not powered, and 1 is a ones vector.

$$w(t)=(1-\gamma)1-K_p ed(t) \qquad \text{Equation 4}$$

The thread-to-core mapping module 240 receives a set of scheduled process threads 270 and a vector of reliability demands rd(t) 275 for the scheduled process threads 270. The thread-to-core mapping module 240 may map the scheduled process threads 270 to the cores 105. In one embodiment, the thread-to-core mapping module 240 matches the scheduled process threads 270 to available cores 105, where available cores 105 are powered cores 105. In one embodiment, the mapping accommodates the reliability demands 275 of the cores 105. The mapping of the scheduled process threads 270 to the cores 105 will be described hereafter. The thread-to-core mapping module 240 generates a process threads mapping 245 that assigns process threads to cores 105.

The thread-to-core mapping module 240 considers one or more of sustainability and energy efficiency in mapping the process threads to the cores 105. In one embodiment, the mapping may be sustainability oblivious, and optimize the mapping for energy efficiency. Alternatively, the mapping may be sustainability controlled, with the sustainability considered in generating the mapping. In a certain embodiment, the mapping may be sustainability aware, with both sustainability and energy efficiency considered in the mapping.

The cores 105 execute the process threads. The sensors 110 detect delay rates and error rates 255 in the cores 105 during the execution of the process threads and communicate the delay and error rates 255 to the reliability module 260. The reliability module 260 calculates degradation rates for the cores 105 from the delay and error rates 255. In one embodiment, a degradation rate estimates degradation of core circuits for a specified time interval such as an epoch. Alternatively, the degradation rate estimates the degradation of core circuits for the life of the semiconductor 100.

The reliability module 260 further calculates the current reliability levels r(t) 265 from the degradation rates. The current reliability levels 265 may be a probability of a timing violation based on a process variation. Alternatively, the current reliability levels 265 may be a probability of a timing violation based on an aging model. In a certain embodiment, current reliability levels 265 may be a probability of a timing violation based on both the process variation and the aging model.

Figure 3:
FIG. 3 is a schematic block diagram illustrating one embodiment of mapping data.

FIG. 3 is a schematic block diagram illustrating one embodiment of mapping data 201 for a core 105. The mapping data 201 includes a core identifier 350, the design time reliability level 205, the current reliability level 265, the reliability error vector 355, the error desired level 225, the desired reliability level 215, the WAC 235, the scheduled process threads 270, the reliability demands 275, the process thread mapping 245, the delay and error rates 255, and the degradation rates 290.

In addition, the mapping data 201 includes an expected energy efficiency 280 and a utilization 285. The expected energy efficiency 280 may specify an energy efficiency and/or an energy consumption for the core 105. The expected energy efficiency 280 may be calculated from an energy consumption of a prior mapping of the process threads to the cores 105. The utilization may be a percentage utilization of the core 105 by one or more process threads. The mapping data 201 for all cores 105 may be centralized within the semiconductor 100.

Figure 4:
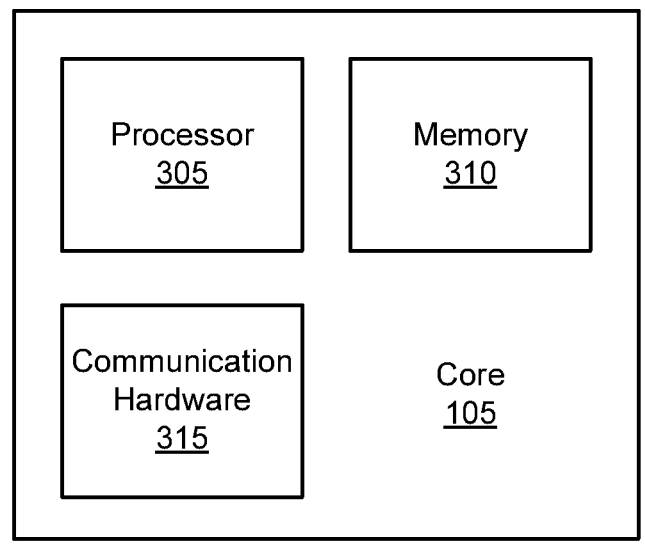
FIG. 4 is a schematic block diagram illustrating one embodiment of a core.

FIG. 4 is a schematic block diagram illustrating one embodiment of a core 105. The core 105 includes at least one processor 305, a memory 310, and communication hardware 315. The memory 310 may be a semiconductor memory and store data and program code. The processor 305 may execute the program code. The communication hardware 315 may communicate with other cores 105.

Figure 5:
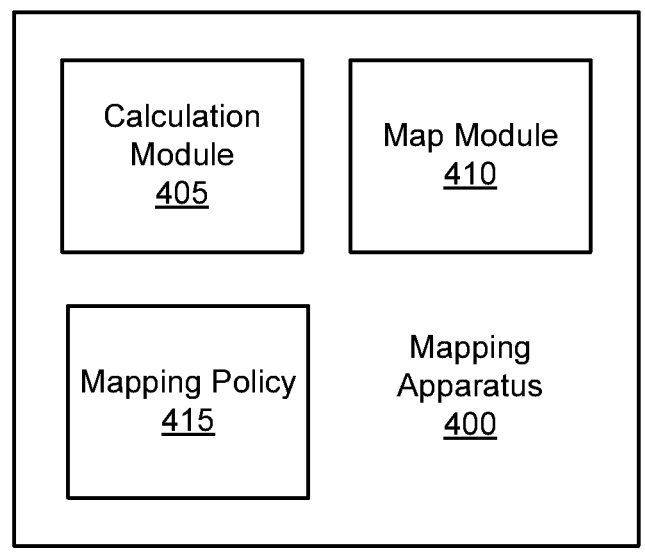
FIG. 5 is a schematic block diagram illustrating one embodiment of a mapping apparatus.

FIG. 5 is a schematic block diagram illustrating one embodiment of a mapping apparatus 400. The mapping apparatus 400 may be embodied in one or more cores 105. The apparatus 400 includes a calculation module 405, a map module 410, and the mapping policy 415. The calculation module 405, the map module 410, and the mapping policy 415 may be embodied in a computer readable storage medium, such as the memory 310, storing program code.

The calculation module 405 may comprise the aging controller 210, the error vector module 220, the WAC controller 230, and the reliability module 260. The map module 410 may include the thread-to-core mapping module 240. The mapping policy 415 may specify when to map a process threads to a core 105 as will be described hereafter.

Figure 6:
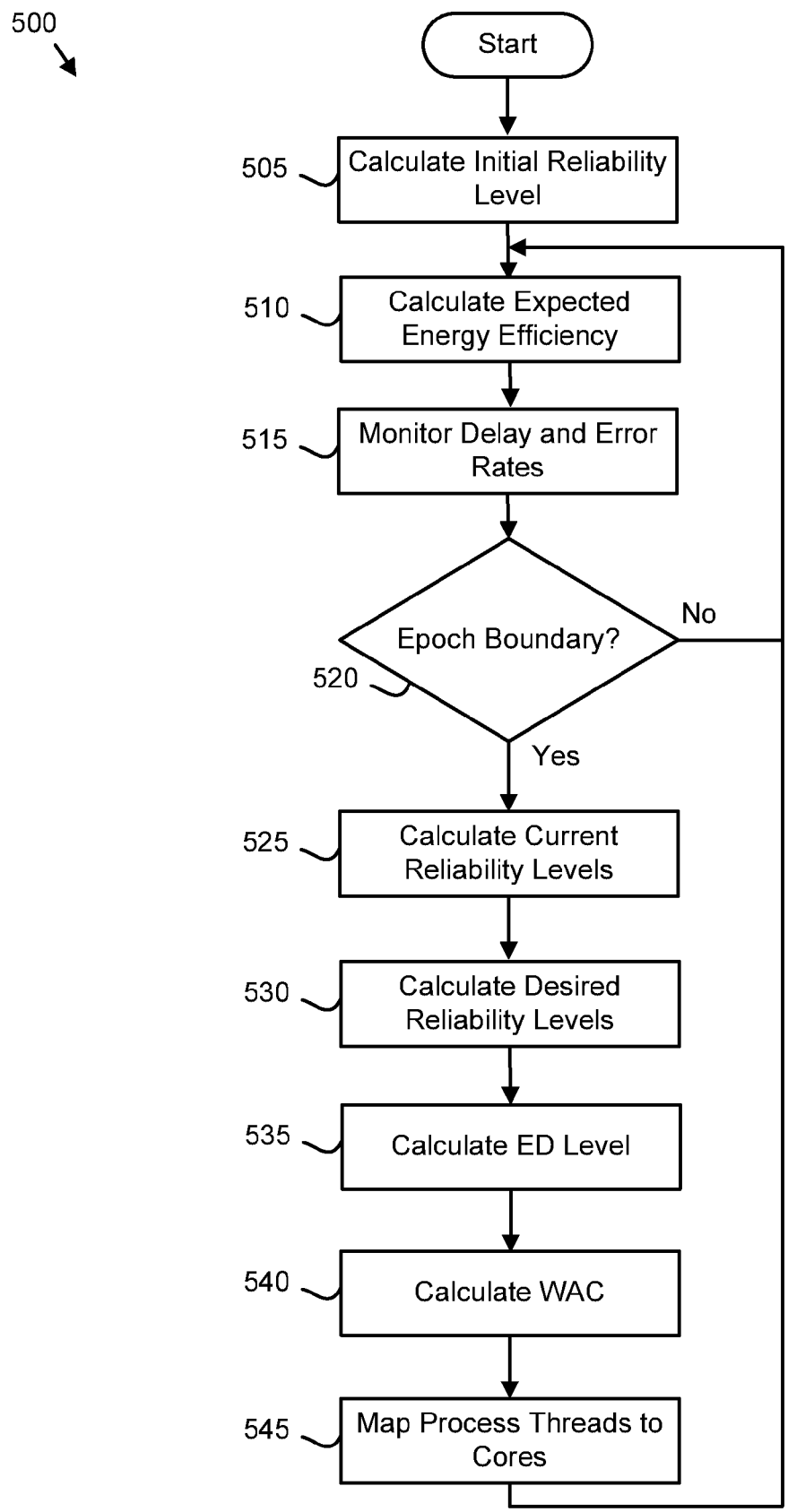
FIG. 6 is a schematic flow chart diagram illustrating one embodiment of a mapping method.

FIG. 6 is a schematic flow chart diagram illustrating one embodiment of a mapping method 500. The method 500 may perform the functions of the semiconductor 100 and the apparatus 400. The method 500 may be performed using the processor 305. Alternatively, the method 500 may be performed by a program product. The program product may comprise a computer readable storage medium, such as the memory 310, storing program code. The processor 305 may execute the program code to perform the functions of the method 500.

The method 500 is performed for a specified number of the cores 105 being not powered. The method 500 starts, and in one embodiment the initial reliability level 205 is calculated 505. The initial reliability level 205 may be calculated as part of the design of the semiconductor 100. The calculation module 405 may further calculate 510 the expected energy efficiency 280. In one embodiment, the expected energy efficiency 280 is calculated from the energy efficiency of a prior mapping of process threads for a plurality of cores 105.

The sensors 110 monitor 515 the delay and error rates 255 for the cores 105. In one embodiment, the calculation module 405 determines 520 if an epoch boundary has been reached. An epoch may be a specified time interval, a specified number of clock cycles, a specified amount of work, or the like. The epoch boundary may be a beginning of the epoch, an end of the epoch, or a specified time within the epoch. If the epoch boundary has not been reached, the calculation module 405 may continue to calculate 510 the expected energy efficiency 280.

If the epoch boundary has been reached, the reliability module 260 calculates 525 the current reliability levels 265. In addition, the aging controller 210 may calculate 530 the reliability error using Equation 1 and a desired reliability level 215 using Equation 2. The error vector module 220 may calculate 535 the error desired level 225 using Equation 3.

The WAC controller 230 may calculate 540 the WAC 235 from the degeneration rates 290 for the cores 105. In one embodiment, the WAC 235 is calculated 540 from the error desired vector ed(t) 225 using Equation 4.

The thread-to-core mapping module 240 may map 545 the scheduled process threads 270 to the cores 105 based on the expected energy efficiency 280 and the WAC 235 for the cores 105 and generate a process thread mapping 245. In one embodiment, the thread-to-core mapping module 240 employs the reliability demands 275 in mapping 545 the scheduled process threads 270 to the cores 105. Mapping 545 the scheduled process threads 270 may be sustainability oblivious, sustainability controlled, and sustainability aware as will be described hereafter.

In one embodiment, sustainability oblivious mapping may be employed to improve expected energy efficiency. Sustainability oblivious mapping may be selected to minimize an energy budget for the semiconductor 100. Alternatively, sustainability controlled mapping may be selected to give precedence to sustainability of the cores 105. Sustainability controlled mapping may lock cores 105 if the WAC 235 exceeds a WAC threshold as will be described hereafter. In one embodiment, sustainability aware mapping may be selected to balance both energy efficiency and sustainability. The thread-to-core mapping module 240 may select sustainability oblivious mapping, sustainability controlled mapping, or sustainability aware mapping as a function of a workload, environmental parameters including temperature, and a long-term sustainability objective.

The method 500 may further loop and the calculation module 405 may continue to calculate 510 the expected energy efficiency 280. The method 500 maps the scheduled process threads 270 to the cores 105 with consideration for the energy efficiency, the sustainability, or both the energy efficiency and sustainability.

Figure 7:
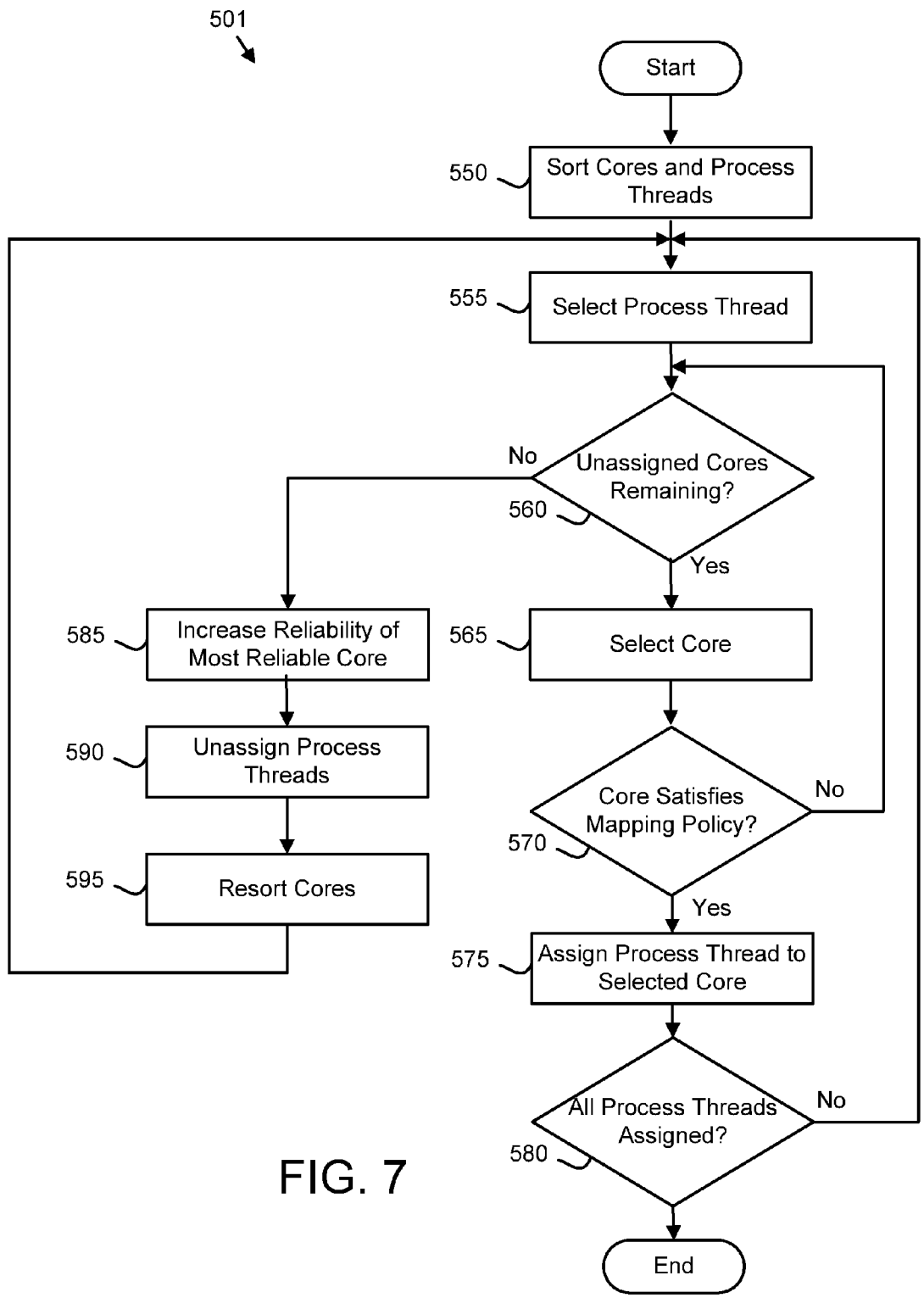
FIG. 7 is a schematic flow chart diagram illustrating one embodiment of a sustainability-oblivious mapping method.

FIG. 7 is a schematic flow chart diagram illustrating one embodiment of a sustainability-oblivious mapping method 501. The method 501 may perform the functions of the semiconductor 100 and the apparatus 400, and in particular may perform sustainability oblivious mapping. The method 501 may be performed using the processor 305. Alternatively, the method 501 may be performed by a program product. The program product may comprise a computer readable storage medium, such as the memory 310, storing program code. The processor 305 may execute the program code to perform the functions of the method 501.

The method 501 starts, and in one embodiment, the thread-to-core mapping module 240 sorts 550 the cores 105 and process threads 270. The thread-to-core mapping module 240 may generate a set of sorted process threads and a set of sorted cores 105. The set of sort of process threads may have increasing reliability demands 275. In addition, the set of sorted cores 105 may have increasing current reliability levels 265.

The thread-to-core mapping module 240 may select 555 a process thread from the set of sorted process threads. The thread-to-core mapping module 240 may further determine 560 if there are unassigned cores 105 remaining. Cores 105 that are dark or not powered are not unassigned, and may not be considered.

If there are no unassigned cores 105 remaining, the thread-to-core mapping module 240 increases 585 the current reliability level 265 of a core 105 in the set of sorted cores 105 with a highest current reliability level 265. In addition, the thread-to-core mapping module 240 may un-assign 590 all process threads that were assigned to cores 105 and resort 595 the cores 105 into a new set of sorted cores 105. The thread-to-core mapping module 240 may again select 555 a process thread from the new set of sorted process threads.

If there are unassigned cores 105 remaining, the thread-to-core mapping module 240 selects 565 an available core 105 from the set of sorted cores 105. The thread-to-core mapping module 240 may determine 570 if the selected core 105 satisfies a mapping policy. In one embodiment, the mapping policy is satisfied when the expected energy efficiency 280 for the core 105 is optimal. In a certain embodiment, the mapping policy 415 is satisfied if the reliability demand 275 for the core 105 is less than the current reliability level 265 for the selected core 105, where rd(t)≤r(c).

If the mapping policy 415 is not satisfied, the thread-to-core mapping module 240 may determine 560 if there are unassigned cores 105 remaining. If the mapping policy 415 is satisfied, the thread-to-core mapping module 240 assigns 575 the process thread to the core 105. The thread-to-core mapping module 240 may further determine 580 if all scheduled process threads 270 are assigned to cores 105. If scheduled process threads 270 remain to be assigned, the thread-to-core mapping module 240 selects 555 a new process thread. If the scheduled process threads 270 are all unassigned, the method 501 ends.

Figure 8:
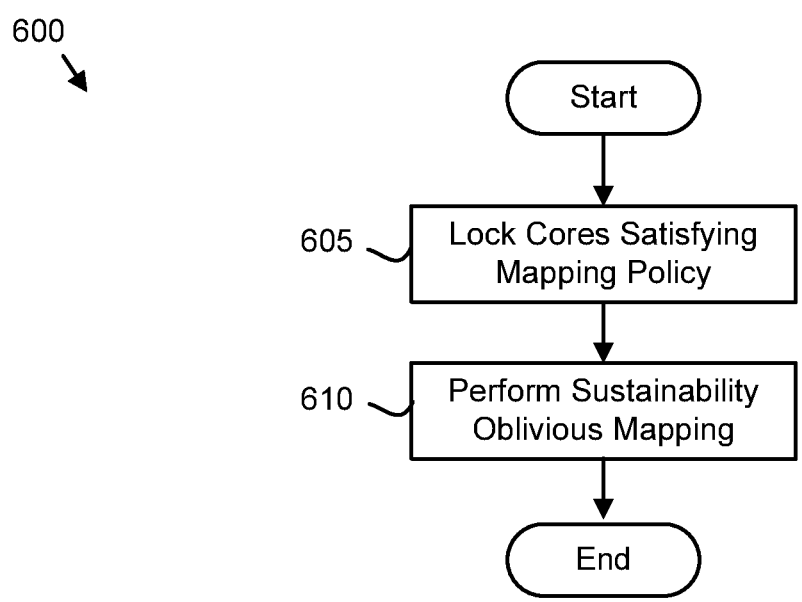
FIG. 8 is a schematic flow chart diagram illustrating one embodiment of a sustainability-controlled mapping method.

FIG. 8 is a schematic flow chart diagram illustrating one embodiment of a sustainability-controlled mapping method 600. The method 600 may perform the functions of the semiconductor 100 and the apparatus 400, and in particular may perform sustainability controlled mapping. The method 600 may be performed using the processor 305. Alternatively, the method 600 may be performed by a program product. The program product may comprise a computer readable storage medium, such as the memory 310, storing program code. The processor 305 may execute the program code to perform the functions of the method 600.

The method 600 starts, and in one embodiment, the thread-to-core mapping module 240 locks 605 the cores 105 that satisfy the mapping policy 415. The mapping policy 415 may be satisfied when the WAC 235 for a core 105 exceeds a specified WAC threshold. A process thread may not be assigned to a locked core 105.

With the cores 105 for which the mapping policy 415 is satisfied locked 605, the thread-to-core mapping module 240 may further perform the sustainability oblivious mapping of method 501 as described in FIG. 7 to map the scheduled process threads 272 the cores 105 and the method 600 ends. By locking cores 105 with a WAC 235 that exceeds the WAC threshold, circuit degradation and aging are reduced for the cores 105 that have already had significant circuit degradation. As a result, degradation and aging are balanced among the cores 105 over time.

Figure 9:
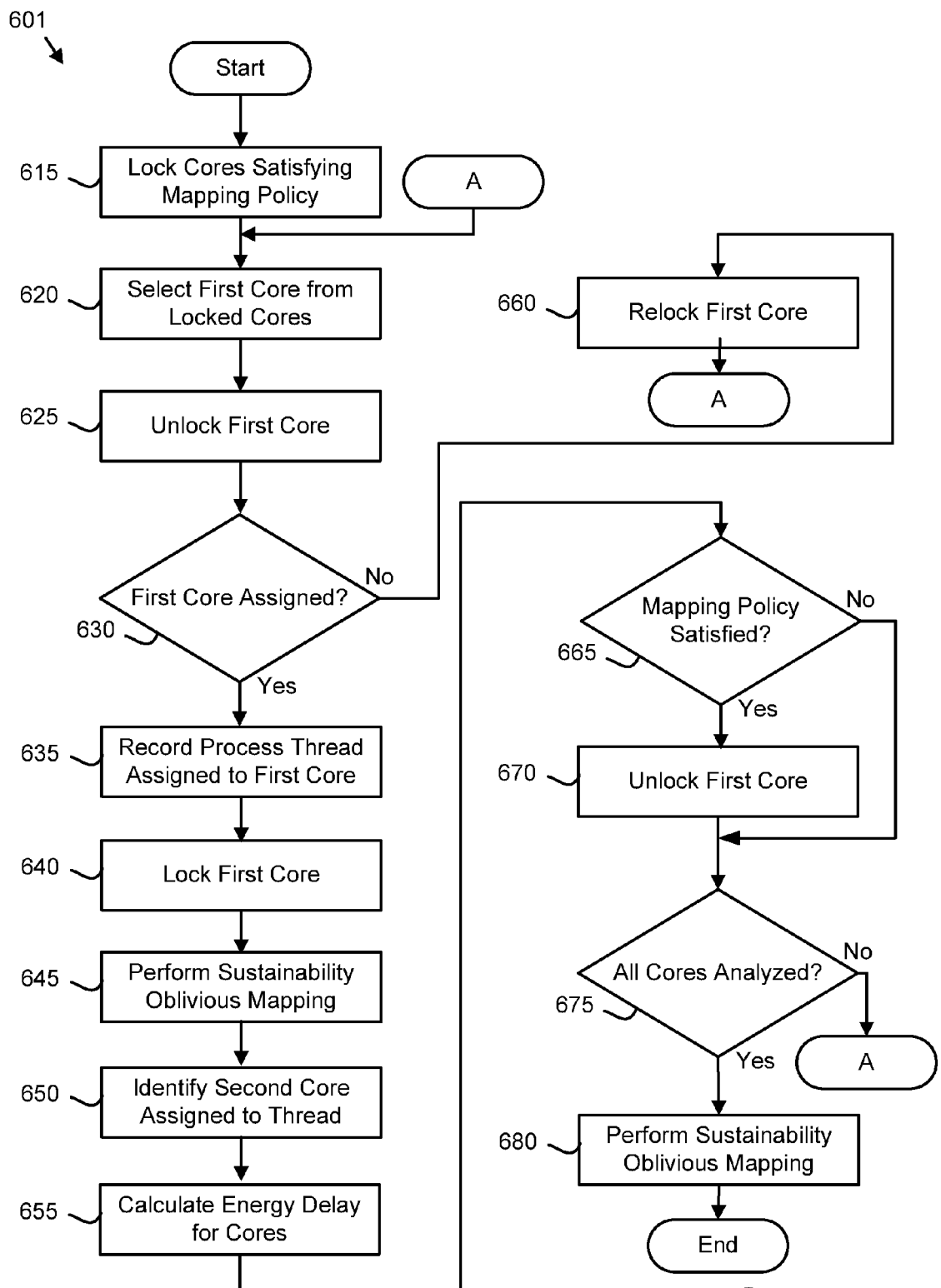
FIG. 9 is a schematic flow chart diagram illustrating one embodiment of a sustainability-aware mapping method.

FIG. 9 is a schematic flow chart diagram illustrating one embodiment of a sustainability-aware mapping method 601. The method 601 may perform the functions of the semiconductor 100 and the apparatus 400, and in particular may perform sustainability aware mapping. The method 601 may be performed using the processor 305. Alternatively, the method 601 may be performed by a program product. The program product may comprise a computer readable storage medium, such as the memory 310, storing program code. The processor 305 may execute the program code to perform the functions of the method 601.

The method 601 starts, and in one embodiment the thread-to-core mapping module 240 locks 615 cores 105 that satisfy the mapping policy 415. The mapping policy 415 may be satisfied when the WAC 235 for a core 105 exceeds the specified WAC threshold.

The thread-to-core mapping module 240 further selects 620 a first core 105 from the locked cores 105 and unlocks 625 the first core 105. A process thread may be assigned to an unlocked core 105. The thread-to-mapping module 240 determines 630 if the first core 105 is assigned to a process thread. If the first core 105 is not assigned, the thread-to-core mapping module 240 relocks 660 the first core 105 and selects 620 a new first core 105.

If the first core 105 is assigned to a process thread, the thread-to-core mapping module 240 records 635 a first process thread assigned to the first core 105 and locks 640 the first core 105. The thread-to-core mapping module 240 further performs 645 the sustainability oblivious mapping of the method 501 described in FIG. 7.

In one embodiment, the thread-to-core mapping module 240 identifies 650 a second core 105 that is assigned to the first process thread and calculates 655 an energy delay for the first and second cores 105. In one embodiment, the energy delay edl is calculated for each core 105 using Equation 5, where e is an estimated energy for the core 105, and d is a delay for the core 105.

$$edl = e * d^2 \qquad \text{Equation 5}$$

The thread-to-core mapping module 240 may further determine 665 if the mapping policy 415 is satisfied. In one embodiment, the mapping policy 415 is satisfied in response to the expected energy efficiency for the first core 105 exceeding an efficiency threshold for the first core 105, wherein the WAC 235 for the first core 105 also exceeds the WAC threshold. In addition, the mapping policy 415 may be satisfied if the utilization 285 for the first core 105 does not exceed the energy delay for the first core 105. In a certain embodiment, the mapping policy 415 is satisfied if the inequality of Equation 6 is satisfied, where edl is the energy delay, AW is a non-zero aging weight, util(l) is a utilization 285 of the locked first core 105, and WAC(l) is the WAC 235 for the locked first core 105, and l is the first locked core 105.

$$edl > AW * (util(l) - WAC(l)) \qquad \text{Equation 6}$$

If the error delay condition is satisfied, the thread-to-core mapping module 240 unlocks 670 the first core 105 and determines 675 if all cores 105 have been analyzed. If the error delay condition is not satisfied, the thread-to-core mapping module 240 determines 675 if all cores 105 have been analyzed.

If all cores 105 have been analyzed, the thread-to-core mapping module 240 performs 680 the sustainability oblivious mapping of method 501 described in FIG. 7 and the method 601 ends. If all the cores 105 have not been analyzed, the thread-to-core mapping module 240 selects 620 a new and unanalyzed first core 105 from the locked cores and the method 601 continues.

By mapping the process threads to the plurality of cores 105 based on at least one of the expected energy efficiency 280 and the WAC 235 with a specified number of the plurality of cores 105 not powered, the embodiments may increase the energy efficiency, increase the sustainability, or increase both the sustainability and the energy efficiency for the cores 105 of the differentially reliable semiconductor 100. In simulations of the embodiments, the embodiments consistently delivered superior energy efficiency when compared with cores 105 mapped with an alternative race-to-idle algorithm.

In addition, the energy efficiency for process threads mapped with the embodiments increases as more of the cores 105 within the semiconductor 100 are not powered.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
calculating, by use of a processor, an expected energy efficiency for a prior mapping of process threads for a plurality of cores;
calculating current reliability levels for the plurality of cores from degradation rates for the plurality of cores;
calculating desired reliability levels for the plurality of cores from the current reliability levels and initial reliability levels for the plurality of cores;
calculating an error desired level from the current reliability levels and the desired reliability levels;
calculating a workload acceptance capacity (WAC) from the error desired level; and
mapping the process threads to the plurality of cores, wherein a process thread is mapped to a core if a mapping policy is satisfied by a utilization for the core not exceeding an energy delay and the WAC for the core not reaching a specified WAC threshold and a specified number of the plurality of cores are not powered and are not mapped to any of the process threads.

2. The method of claim 1, wherein the process thread is mapped to the core if the mapping policy is further satisfied when the expected energy efficiency is optimal.

3. The method of claim 1, wherein the process thread is mapped to the core if the mapping policy is further satisfied when the WAC for the core exceeds the WAC threshold.

4. The method of claim 1, wherein the process thread is mapped to the core if the mapping policy is further satisfied in response to the expected energy efficiency exceeding an efficiency threshold for the core, wherein the WAC for the core exceeds the WAC threshold.

5. The method of claim 1, wherein the WAC w(t) is calculated as $w(t)=(1-\gamma)1-K_p ed(t)$, where ed(t) is the error desired level between a desired reliability level d(t) and a current reliability level r(t), t is the process thread, and $K_p$ is a proportional gain constant.

6. The method of claim 1, wherein the desired reliability level d(t) is calculated as $$d(t) = r(0) - \sum_{i=1}^{n} er_i(t)x \frac{1-r(0)}{n - \sum_{i=1}^{n} r_i(0)}$$

where r(0) is an initial reliability level, er(t) is a reliability error vector between a current reliability level r(t) and the initial reliability level r(0), 1 is a ones vector, and t is the process thread.

7. The method of claim 6, wherein the mapping policy is further satisfied if a utilization for the core does not exceed an energy delay for the core.

8. The method of claim 7, wherein the process threads are not mapped to the core if the core has reached the WAC threshold.

9. The method of claim 6, wherein the current reliability level r(t) is a probability of a timing violation based on a process variation and an aging model.

10. The method of claim 1, wherein the process thread is mapped to the core if an inequality $ed(t)^2>AW\times(util(l)-WAC(l))$ is satisfied, where ed(t) is an error desired vector, AW is a specified aging weight, util(l) is a utilization of the core, and WAC(l) is the WAC for the core.

11. The method of claim 1, wherein the energy delay edl is calculated as $edl=e*d^2$ where e is an estimated energy for the core and d is a delay for the core.

12. An apparatus comprising:
a non-transitory memory storing computer readable code executable by a processor, the computer readable code comprising:
computer readable code that calculates an expected energy efficiency for a prior mapping of process threads for a plurality of cores, calculates current reliability levels for the plurality of cores from degradation rates for the plurality of cores, calculates desired reliability levels for the plurality of cores from the current reliability levels and initial reliability levels for the plurality of cores, calculating an error desired level from the current reliability levels and the desired reliability levels and calculating a workload acceptance capacity (WAC) from the error desired level; and
computer readable code that maps the process threads to the plurality of cores, wherein a process thread is mapped to a core if a mapping policy is satisfied by a utilization for the core not exceeding an energy delay and the WAC for the core not reaching a specified WAC threshold and a specified number of the plurality of cores are not powered and are not mapped to any of the process threads.

13. The apparatus of claim 12, wherein the process thread is mapped to the core if the mapping policy is further satisfied when the expected energy efficiency is optimal.

14. The apparatus of claim 12, wherein the process thread is mapped to the core if the mapping policy is further satisfied when the WAC for the core exceeds the specified WAC threshold.

15. The apparatus of claim 12, wherein the process thread is mapped to the core if the mapping policy is further satisfied in response to the expected energy efficiency exceeding an efficiency threshold for the core, wherein the WAC for the core exceeds the WAC threshold.

16. The apparatus of claim 12, wherein the energy delay edl is calculated as $edl=e*d^2$ where e is an estimated energy for the core and d is a delay for the core.

17. A program product comprising a non-transitory computer readable storage medium storing computer readable code executable by a processor to perform:
calculating an expected energy efficiency for a prior mapping of process threads for a plurality of cores;
calculating current reliability levels for the plurality of cores from degradation rates for the plurality of cores;
calculating desired reliability levels for the plurality of cores from the current reliability levels and initial reliability levels for the plurality of cores;
calculating an error desired level from the current reliability levels and the desired reliability levels;
calculating a workload acceptance capacity (WAC) from the error desired level; and
mapping the process threads to the plurality of cores, wherein a process thread is mapped to a core if a mapping policy is satisfied by a utilization for the core not exceeding an energy delay and the WAC for the core not reaching a specified WAC threshold and a specified number of the plurality of cores are not powered and are not mapped to any of process threads.

18. The program product of claim 17, wherein the process thread is mapped to the core if the mapping policy is further satisfied when the expected energy efficiency is optimal.

19. The program product of claim 17, wherein the process thread is mapped to the core if the mapping policy is further satisfied when the WAC exceeds for the core exceeds the WAC threshold.

20. The program product of claim 17, wherein the process thread is mapped to the core if the mapping policy is further satisfied in response to the expected energy efficiency exceeding an efficiency threshold for the core, wherein the WAC for the core exceeds the WAC threshold.

* * * * *